United States Patent
Iwasaki et al.

[19]

[11] Patent Number: 6,145,015
[45] Date of Patent: *Nov. 7, 2000

[54] MULTIMEDIA DATA TRANSFERRING METHOD

[75] Inventors: Masaaki Iwasaki, Tachikawa; Shouji Nakamura; Tadashi Takeuchi, both of Yokohama, all of Japan

[73] Assignee: Hitachi, Ltd., Tokyo, Japan

[*] Notice: This patent is subject to a terminal disclaimer.

[21] Appl. No.: 09/208,013

[22] Filed: Dec. 9, 1998

Related U.S. Application Data

[63] Continuation of application No. 08/729,839, Oct. 15, 1995, Pat. No. 5,892,968.

[51] Int. Cl.[7] .......................................................... G06F 3/00
[52] U.S. Cl. ........................ 710/1; 710/3; 710/5; 710/23; 709/200
[58] Field of Search .................................. 710/1, 3, 5, 7, 710/22, 23; 709/200, 201

[56] References Cited

U.S. PATENT DOCUMENTS 5,060,140   10/1991   Brown et al. .
5,339,413   8/1994   Koval et al. .

FOREIGN PATENT DOCUMENTS 0578013   1/1994   European Pat. Off. .

*Primary Examiner*—Meng-Ai T. An
*Assistant Examiner*—Mackly Monestime
*Attorney, Agent, or Firm*—Antonelli, Terry, Stout & Kraus, LLP

[57] ABSTRACT

A method of transferring multimedia data from an input device to an output device in a computer system having a plurality of input/output devices. An application program specifies an origination and destination of multimedia data transfer and orders multimedia data transfer start. A periodic driven program conducts multimedia data transfer in accordance with the order given by the application program. The application program can conduct other processing irrespective of the multimedia transfer state after giving the transfer start order. The periodic driven program operates with a predetermined period, divides multimedia data, and transfers the multimedia data in a plurality of periods.

9 Claims, 12 Drawing Sheets

FIG. 3

211 PERIODIC CHANNEL TABLE

| PORT IDENTIFIER | INPUT/ OUTPUT CLASSIFI- CATION | CHANNEL IDENTIFIER | CHANNEL STATUS | PAIRED DEVICE NUMBER | PAIRED PORT IDENTIFIER | TRANSFER RATE | PROCESS IDENTIFIER |
|---|---|---|---|---|---|---|---|
| 302 | 303 | 304 | 305 | 306 | 307 | 308 | 309 |

| DEVICE NUMBER | POINTER |
|---|---|
| 1 | |
| 2 | |
| 3 | |
| 4 | |

301

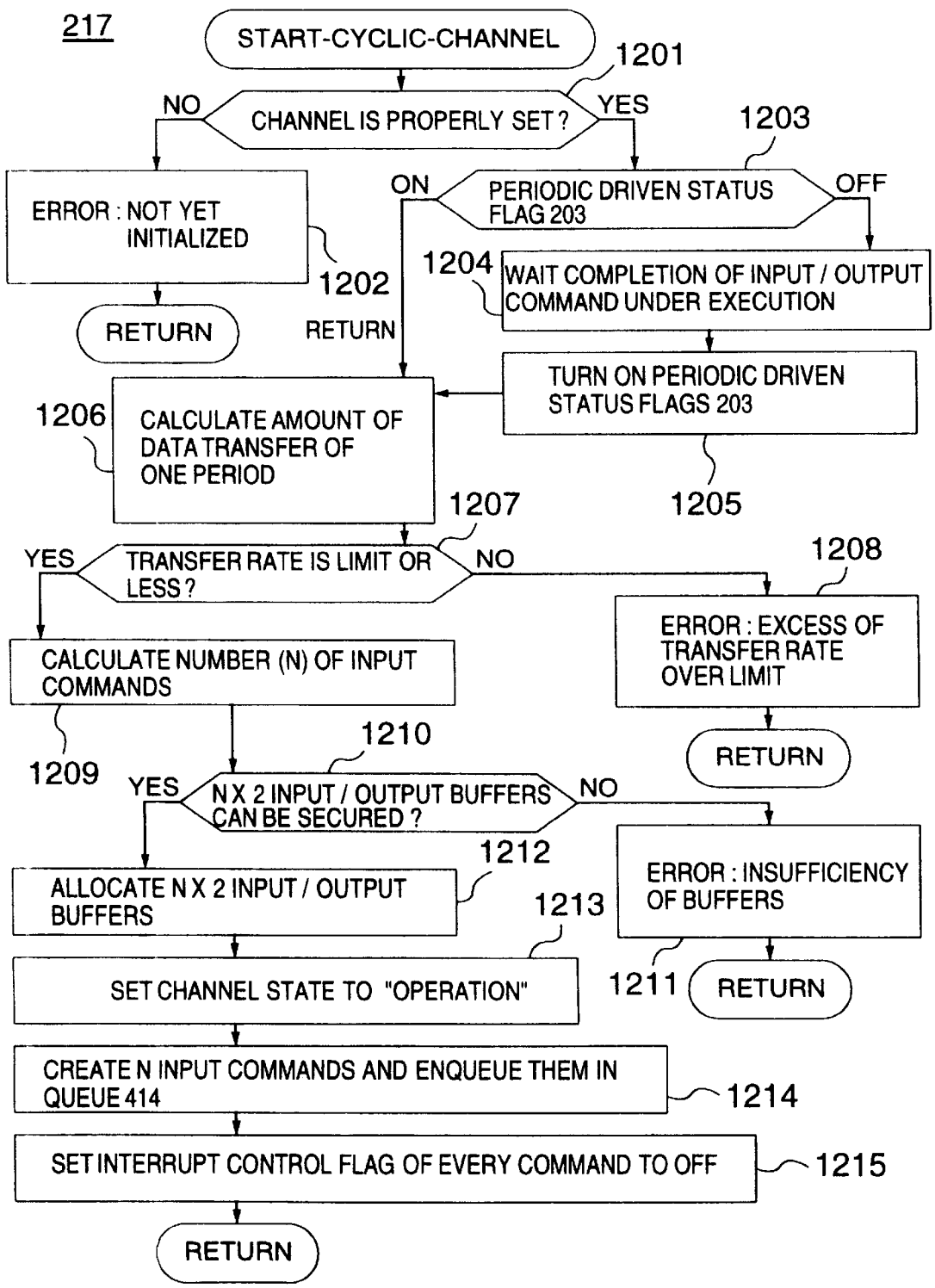

MULTIMEDIA DATA TRANSFERRING METHOD

This application is a continuation of Ser. No. 08/729,839 filed Oct. 15, 1996 now U.S. Pat. No. 5,892,968.

BACKGROUND OF THE INVENTION

1. Field of the Invention

The present invention relates to an input/output subsystem of a computer system. In particular, the present invention relates to a periodic input/output control method and apparatus for implementing the real time input/output function of multimedia data such as video image data or audio data.

2. Description of the Related Art

Inputting/outputting in the existing computer systems is conducted as described below. A processor (CPU) starts an input/output operation of an input/output controller. The input/output controller for controlling input/output devices notifies the processor of completion of the input/output operation by using an external interrupt. For example, such processing is conducted in a disk device.

This is caused by the following facts. First, the operating system cannot predict beforehand when the application program issues an input/output request. Secondly, the time required until the completion of the issued input/output operation is indefinite. In other words, external interrupts are used as means for the input/output controller to notify the processor of an input/output completion event which occurrence time cannot be predicted.

An interface with a program (or function or subroutine) provided to the application program by the system to cause such input/output operation to be conducted is called normal input/output interface.

However, inputting/outputting multimedia data such as video images requiring the real time processing causes a problem that data transfer throughput required for the real time transfer cannot be realized due to the overhead of this interrupt processing. Strictly speaking, besides the input/output completion interrupt processing, overheads of the input/output system call and task switching become bottlenecks on the performance. (Hereafter, these are generally referred to as software overheads.)

In the Quick Time of Apple Computer (multimedia extension of the Macintosh operating system), a new application interface is provided in order to reduce this software overhead (Inside Macintosh: Quick Time and Inside Macintosh: Quick Time Components). In the case where video images taken in this interface from a video digitizer (video input device) are outputted to a display device, some initializing functions are called and then the display start function SGStartPreview is called.

When the application has called the function SGStartPreview, the transfer of video data from the video digitizer to the display device is started. Upon start of this transfer, the function SGStartPreview is normally brought to an end without waiting the completion of data transfer and returns to the application, but the transfer of the video data is continued. In other words, video data divided into a plurality of blocks are continuously transferred one after another from the video digitizer to the display device, but the application is not notified of the transfer completion of each block. Upon calling the function SGStop by the application, the transfer of the video data can be finished.

The interface of the Quick Time does not return the control to the application when the operation for inputting from the video digitizer or the operation for outputting to the display device has been completed. The transfer of video data once started is continued without an interposition of the application until the stop function SGStop is explicitly called.

An interface with a program (or function or subroutine) provided to the application program by the system to cause such input/output operation to be conducted is called multimedia data transfer interface.

SUMMARY OF THE INVENTION

Multimedia data are characterized by a large volume and being accessed sequentiality and that the data volume to be transferred in a time unit can be predicted.

Since multimedia data contain moving picture signals and speech signals, real time processing is required of their transfer. Furthermore, multimedia data are stored in various media. In addition, transfer is conducted between various devices such as the media, a network control device, and a display device.

From the viewpoint of the input/output device, the above described video digitizer is occupied by one application task at a time. However, the greater part of input/output devices are shared by a plurality of application tasks.

An external interrupt which notify the completion of the input/output operation is generated by an input/output controller for controlling the input/output device. In existing systems, the normal input/output interface requiring an external interrupt for each completion of input/output operation cannot coexist with the multimedia data transfer interface which does not generate an external interrupt for each completion of input/output operation.

An object of the present invention is to provide a unific application interface usable in multimedia data transfer irrespective of the kind of the devices of the source and the destination.

Another object of the present invention is to provide an application interface which does not need specifying a physical input/output device so that an application task developed on a certain hardware device may operate on another hardware device as well.

Another object of the present invention is to cause devices such as a disk device and a network control device to be shared by an application task using the normal input/output interface which needs the input/output completion interrupt and an application task using the multimedia data transfer interface which suppresses the input/output completion interrupt.

Another object of the present invention is to prevent a delay from being caused in data transferred and inputted/outputted by either of the above described tasks.

In order to achieve the above described objects, the present invention provides the following four application interfaces for multimedia data transfer. Herein, the terms "input port" and "output port" indicate the data destination and source, respectively. If they are files stored in the disk device, they are identified by file names or file descriptors. If they are communication devices, they are identified by sockets or communication port descriptors.

In initializing or after initializing an input port and an output port, a first application interface is specified with port identifiers and declares that the ports are ports for multimedia data transfer.

A second application interface is specified with port identifiers each uniquely associated with each of these ports to define a combination (channel) of an input port and an output port, and provides the channel with a unique identifier (channel identifier).

A third application interface is specified with this channel identifier and starts transfer of multimedia data. A fourth application interface is specified with this channel identifier and stops transfer of the multimedia data.

To implement this interface, a computer system according to the present invention has a channel table indicating association among input/output devices, ports and channels, a processing unit for inputting data into the channel table, and a processing unit for automatically generating an input/output command, starting input/output operation, and monitoring the end of the input/output command.

Furthermore, a computer system according to the present invention includes a status flag indicating for each input/output device whether the device is conducting input/output processing on real time multimedia data such as video images, a processing unit for setting the status flag when starting transfer of multimedia data to the input/output device by using the third application interface, a processing unit for resetting the status flag when stopping transfer of multimedia data to the input/output device by using the fourth application interface, a processing unit for controlling the on/off state of the external interrupt at the time of completion of the input/output operation for the input/output device according to the status flag when issuing the input/output command, and a processing unit for detecting the completion of the input/output operation by periodic polling in the case where the status flag is set and the external interrupt from the input/output device is off.

BRIEF DESCRIPTION OF THE DRAWING

FIG. 3 is a diagram showing the structure of a periodic channel table;

FIG. 12 is a flowchart showing the processing flow of Start-Cyclic-Channel.

DESCRIPTION OF THE PREFERRED EMBODIMENTS

Figure 1:
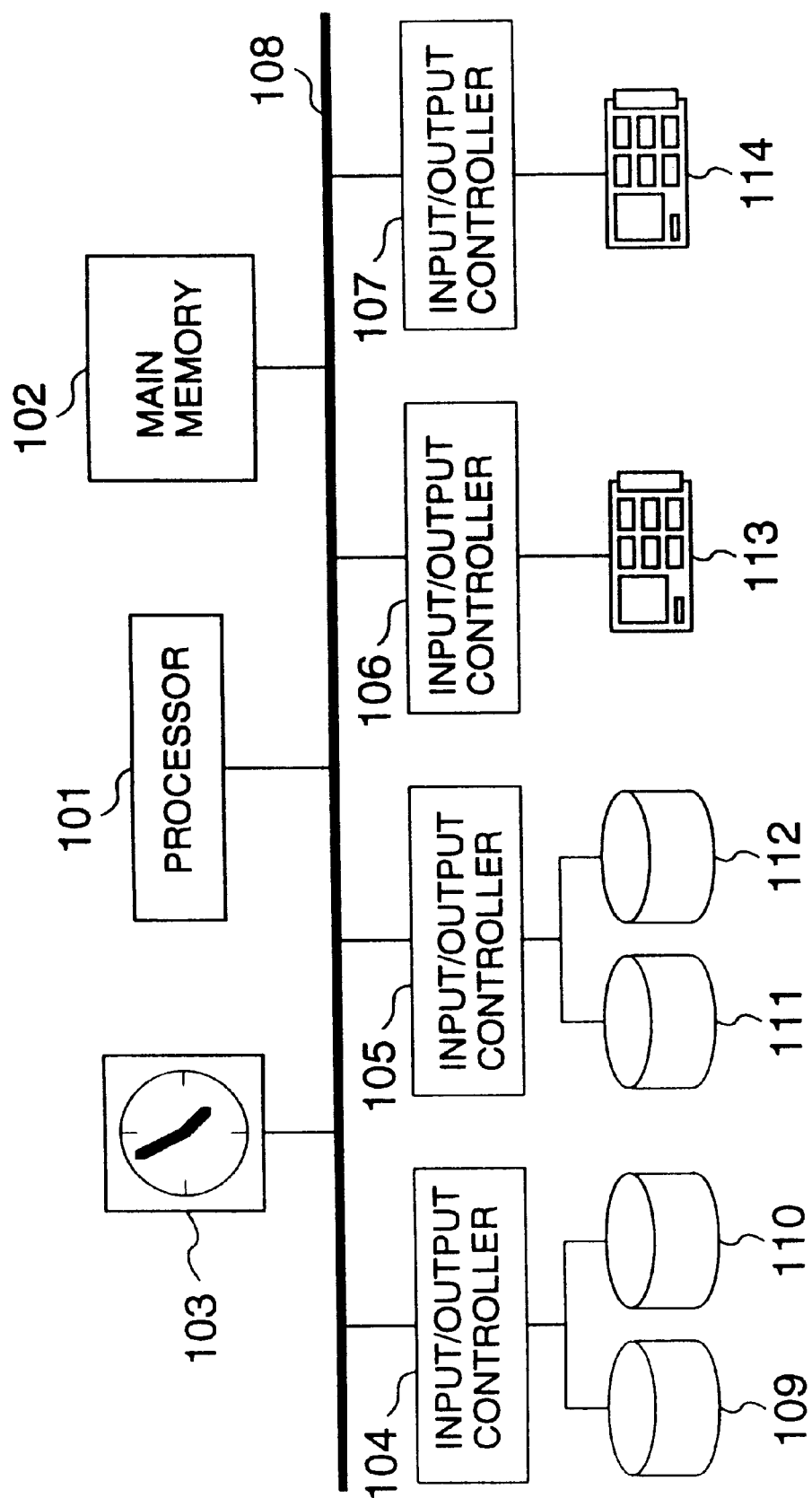
FIG. 1 is a diagram showing the configuration of hardware of a computer system according to the present invention.

By referring to the drawing, preferred embodiments of the present invention will now be described.

(1) System Configuration

The system configuration of the hardware and software of a preferred embodiment will now be described roughly.

FIG. 1 shows the hardware configuration. As for the hardware, a processor (CPU) 101, a main memory 102, an external timer 103, and various input/output controllers 104 through 107 are connected via a bus 108. Input/output devices such as disks 109 through 112 and network adapters 113–114 are connected to input/output controllers 104 through 107.

The input/output controllers 104 through 107 have DMA transfer functions and transfer data between the main memory 102 and input/output devices according to an order given by the processor 101. Orders given to the input/output controllers 104 through 107 by the processor 101 are delivered as input/output commands on the main memory 102. The input/output controllers 104 through 107 have a function of conducting processing collectively on a command chain formed by linking a plurality of input/output commands by pointers. For each command on the command chain, the operating system (OS) can specify whether an external interrupt should be generated when the operation of the command has been completed.

The external timer 103 has a function of issuing an external interrupt to the processor 101 at fixed time intervals. The time interval (period) of the interrupts can be controlled by the operating system.

Figure 2:
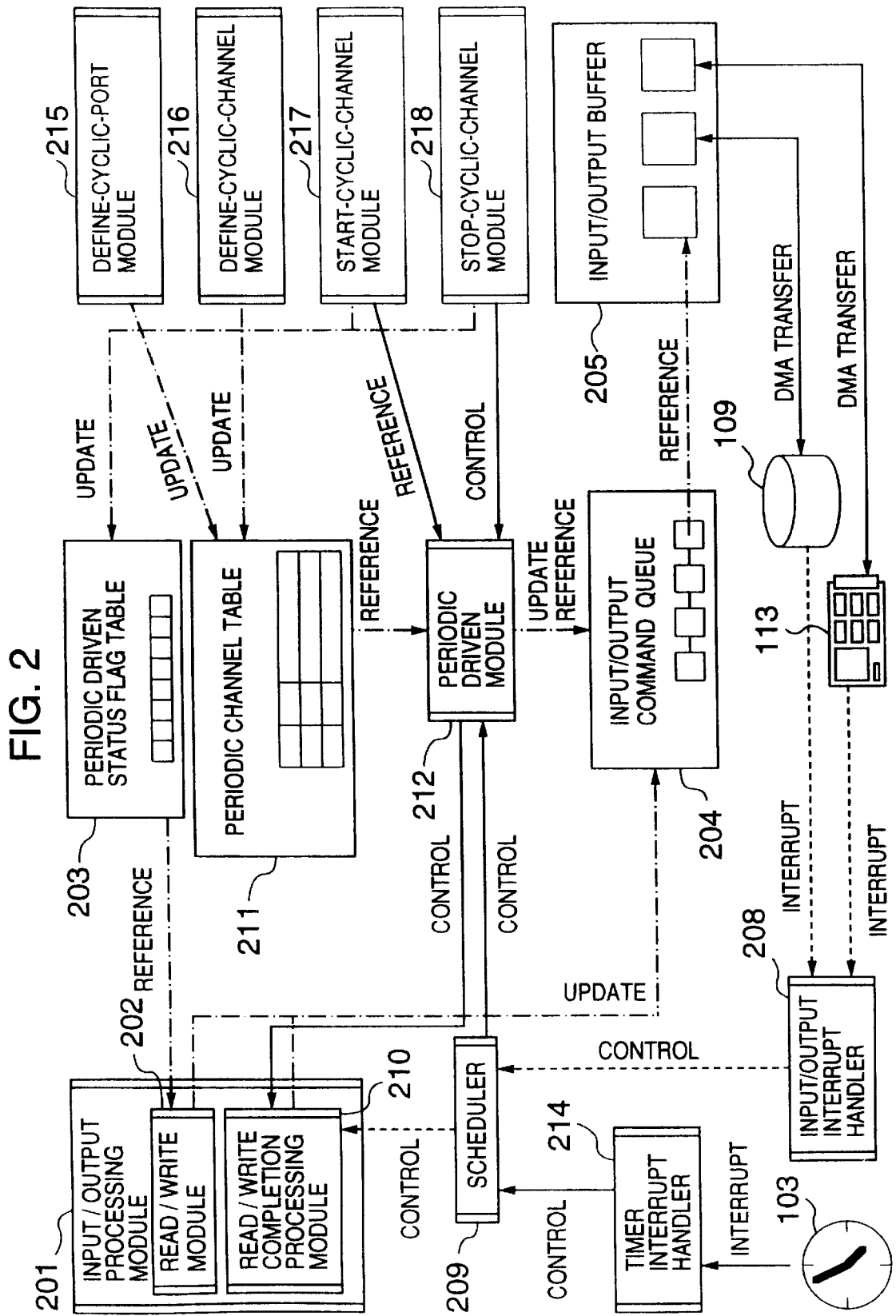
FIG. 2 is a diagram showing the configuration of software of a computer system according to the present invention.

FIG. 2 shows software components relating to the present invention. As for the hardware such as the above described input/output devices, the operating system effects control so as to prevent the application program (user process) from unreasonably using them and the user process indirectly utilizes the hardware by issuing a system call.

In order to process input/output requests issued by the user process, there are, within the operating system, an input/output buffer 205, control data such as an input/output command queue 204, a periodic driven status flag 203 and a periodic channel table 211, and software modules such as a timer interrupt handler 214, an input/output interrupt handler 208, a periodic driven module 212, a scheduler 209 and an input/output processing module 201.

The periodic driven status flag 203 indicates whether transfer of multimedia data for each input/output device is active or not. Taking a timer interrupt from an external timer 213 as an opportunity, the periodic driven module 212 is started. Specifically, upon occurrence of a timer interrupt, the processor discontinues a program currently under execution and starts the timer interrupt handler 214. This handler 214 starts the periodic driven module 212 via a scheduler 209. If the periodic driven status flag 203 is on, then the periodic driven module 212 refers to the periodic channel table 211, conducts input/output operation completion checkup for input/output devices which are active in multimedia data transfer, and conducts start processing for the next input/output command. If the periodic driven status flag 203 is off, then the input/output interrupt handler 208 checks up the completion of the input/output operation for that input/output device.

The input/output processing module 201 includes a read/write module 202 and a read/write completion processing module 210. The input/output processing module 201 conducts processing for a device input/output operation requested from the application program by using the normal input/output interface. On the other hand, the modules 215 through 218 conducts processing for data transfer requested from the application program by using the multimedia data transfer interface. These modules are executed by the CPU. Details of these modules will be described later.

(2) Multimedia Data Transfer Interface

The application interface for multimedia data transfer provided by the present invention will now be described.

Hereafter, four kinds of application interfaces provided by the present invention, i.e., Define-Cyclic-Port, Define-Cyclic-Channel, Start-Cyclic-Channel and Stop-Cyclic-Channel will be described in order of use effected by the application program. Except function names and terms peculiar to the present invention, expression in the following description follows the function names and terms of the UNIX operating system.

Description form: Define-Cyclic-Port (fd)
Function: It initializes input/output ports. Thereafter, it is specified with a port identifier, and declares that the port is a port for multimedia data transfer.
Argument: A port identifier fd is a file descriptor obtained as a return value of an open system call (in the case of a file on a disk) or a socket system call (in the case of network communication).
Return value: Port identifier (positive integer). If the return value is a negative integer, an error has occurred.
Description form: Define-Cyclic-Channel (from, to, rate)
Function: It is specified with port identifies uniquely associated with ports, defines a combination (channel) of an input port (from) and an output port (to), and provides this channel with a unique identifier (channel identifier).
Argument: The argument "from" specifies the port identifier of an input port.

The argument "to" specifies the port identifier of an output port.

The argument "rate" specifies a data transfer rate. In the case of a variable bit rate, it specifies the maximum transfer rate.
Return value: Channel identifier (positive integer). If the return value is a negative integer, an error has occurred.
Description form: Start-Cyclic-Channel (channel)
Function: It is specified with a channel identifier, and starts multimedia data transfer on that channel.
Argument: The argument "channel" specifies a channel identifier.
Return value: The return value is 0 in the case of normal termination. Otherwise, an error has occurred.
Description form: Stop-Cyclic-Channel (channel)
Function: It is specified with a channel identifier, and discontinues multimedia data transfer on that channel. And that channel is released.
Argument: The argument "channel" specifies a channel identifier.
Return value: The return value is 0 in the case of normal termination. Otherwise, an error has occurred.

In the application program, the data source and the data destination are first brought into an accessible status by issuing an open system call or a socket system call, respectively. Furthermore, for each of the data source and data destination, the Define-Cyclic-Port is called. Subsequently, by calling the Define-Cyclic-Channel once, a channel for data transfer is defined. By calling the Start-Cyclic-Channel once, data transfer is started. After this module call, data transfer is conducted automatically by the system and consequently the application program may conduct different processing or may be terminated. The Stop-Cyclic-Channel is called in the case where the application program forcibly discontinues transfer started once or releases a channel defined in the Define-Cyclic-Channel.

(3) Data Structure and Processing

While the multimedia data transfer interface has been described in the preceding section, the data structure and the processing of the system for implementing the data transfer will be described in the present section.

The periodic driven status flag table 203 has flags for respective input/output devices and each flag represents whether the device is in the periodic driven status. As to the network adapters 113–114, the transmitting system and the receiving system is regarded as respectively independent devices. This table 203 is created at the time of system start, and placed on the main memory 102 during system operation. For one device, a plurality of channels can be defined. If the flag of a certain device is on, then at least one of channels relating to the device is executing the multimedia transfer and the device is in the periodic driven status. If the flag is off, all channels relating to the device are not executing the multimedia transfer and the device is in the normal operation status. Upon execution of the function Start-Cyclic-Channel, the flag of the relating device turns on. If an active channel has disappeared on the device as a result of execution of the function Stop-Cyclic-Channel, the flag turns off.

The structure of the periodic channel table 211 is shown in FIG. 3. As shown in FIG. 3, the table is divided so as to be associated with respective devices. By pointers of an index portion 301, information (302 through 309) of a plurality of channels belonging to respective devices are pointed at. This table 211 is created at the time of system start and placed on the main memory 102 during system operation. Information (302 through 309) of the channels are set by execution of the above described function Define-Cyclic-Port and function Define-Cyclic-Channel.

The periodic channel table 211 has the following fields.

(a) Port identifier 302: An identifier uniquely assigned to the pertinent input/output port is stored therein.

(b) Input/output classification 303: It indicates the distinction of the input/output (or reception/transmission) of the pertinent input/output port. In the case of a disk device, "input" means reading data from the disk, and "output" means writing the data onto the disk. In the case of a network device, "input" means receiving a packet from the network, and "output" means transmitting a packet to the network.

(c) Channel identifier 304: An identifier of a channel including the pertinent input/output port is stored therein.

(d) Channel status 305: It indicates the status of the channel including the pertinent input/output port, i.e., whether the pertinent channel is being periodically driven or not (i.e., active or not).

(e) Paired device number 306: The identification number of a device including an input/output port paired with the pertinent input/output port to form a channel is stored therein. Typically, the device including an input port is different from the device including an output port. (In the case of file copy, for example, however, both devices might be a single same device.)

(f) Paired port identifier 307: The identifier of an input/output port paired with the pertinent input/output port to form a channel is stored therein. Any single input/output port does not belong to a plurality of channels at the same time. In addition, a channel is always formed by a pair of one input port and one output port.

(g) Transfer rate 308: The input/output data transfer rate of the pertinent channel (in the case of fixed bit rates) is stored therein. In the case of variable bit rates, the maximum permissible data transfer rate is stored.

(h) Process identifier 309: The process identifier of the process using the pertinent channel is stored therein. Any single channel is not used by a plurality of processes at the same time. When the process is terminated abnormally, the input/output processing under execution is discontinued and the pertinent channel is automatically released.

Figure 4:
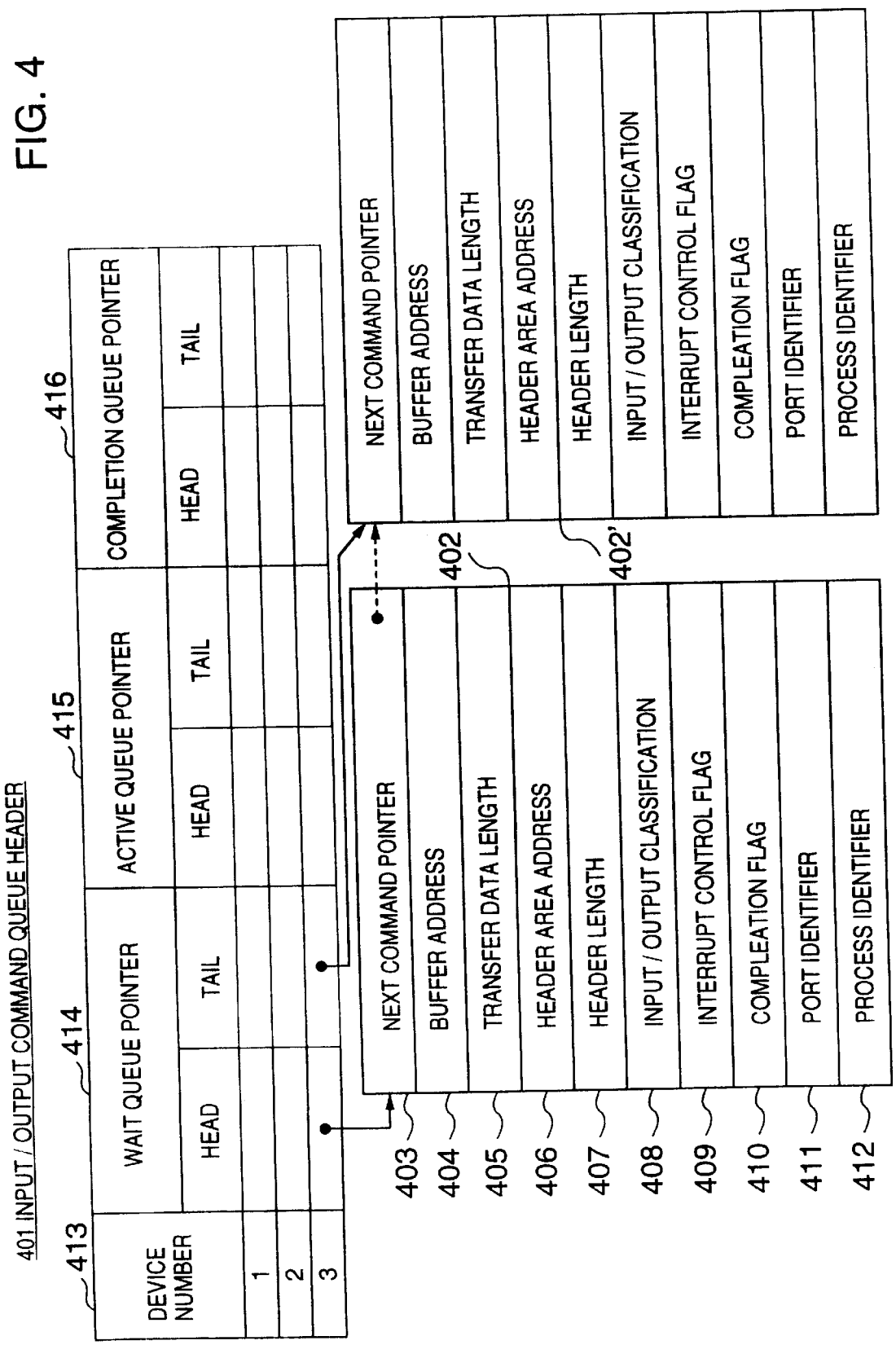
FIG. 4 is a diagram showing the structure of an input/output command queue.

The structure of the input/output command queue 204 is shown in FIG. 4. This input/output command is created by the Start-Cyclic-Channel module, the normal input/output module and the periodic driven module. This input/output command is a command given to the input/output controller as an order. The input/output command queue 204 includes a queue header 401 and commands 402 forming a queue. The input/output command queue header 401 points at three kinds of queues for each device. In each queue, the input/output commands 402 form a queue. A wait queue 414 is a queue for holding, in order of acceptance, requests issued by the application. An active queue 415 holds input/output commands which started the input/output operation. As for input/output commands on this queue 415, there is a possibility that the input/output controller is currently accessing the commands. A completion queue 416 holds input/output commands for which data transfer with input/output devices has been finished.

The queue header 401 is created at the time of system start, and placed on the main memory during system operation. The above described modules creates the commands 402 in an area on the main memory and chains them.

The input/output command 402 has the following fields.

(a) Next command pointer 403: It is a pointer for chaining a plurality of data transfer commands. Herein, it is supposed that each device has the command chain function.

(b) Buffer address 404: It indicates the top address of a buffer for transferring data by each command.

(c) Transfer data length 405: It specifies the byte size of data transferred by each command.

(d) Header area address 406: In the case of input/output controllers 106 and 107 for network devices, it indicates the top address of the area for storing the communication protocol header. Herein, it is supposed that the input/output controllers 106 and 107 for network devices have so-called header split and header gather function. In the case of the input/output controllers 104 and 105 for disk devices, the present field indicates the sector address of a disk in conjunction with a header length field 407.

(e) header length 407: In the case of the input/output controllers 106 and 107 for network devices, it indicates the size of the communication protocol header. In the case of the input/output controllers 104 and 105 for disk devices, the present field indicates the sector address of a disk in conjunction with a header area address field 406.

(f) Input/output classification 408: It specifies the distinction of input/output of the pertinent input/output command. In the case of a disk device, "input" means reading data from a disk and "output" means writing data into a disk. In the case of a network device, "input" means receiving a packet from the network and "output" means transmitting a packet to the network.

(g) Interrupt control flag 409: In the case where the input/output controller has completed the execution of the pertinent input/output command, the interrupt control flag specifies whether the interrupt should be delivered to the CPU. In the case where an interrupt has been generated, the pertinent device discontinues execution of the input/output operation until the CPU executes an interrupt handler and accepts an interrupt request of the device. Typically, by setting the interrupt control flag to on only in the command located at the end of the command chain and setting the interrupt control flags to off in other commands, the number of times of interrupt occurrence is reduced and the load of the CPU side is lightened.

(h) Completion flag 410: It is a flag indicating whether the pertinent command has already been executed by the input/output controller. Before starting the input/output controller, the CPU clears this field. When the input/output operation of the pertinent command has been completed, the input/output controller sets a termination code in the present field. By referring to the present field, the CPU side can determine the termination situation of the input/output command.

(i) Port identifier 411: A port identifier of an input/output port associated with the pertinent input/output command is stored therein.

(j) Process identifier 412: The process identifier of the process which issued the pertinent input/output command is stored therein. When notifying the command issue origination process that the input/output command has been completed, for example, the OS refers to the present field.

Processing of the multimedia transfer module described in the "Multimedia Data Transfer Interface" will now be described.

Figure 10:
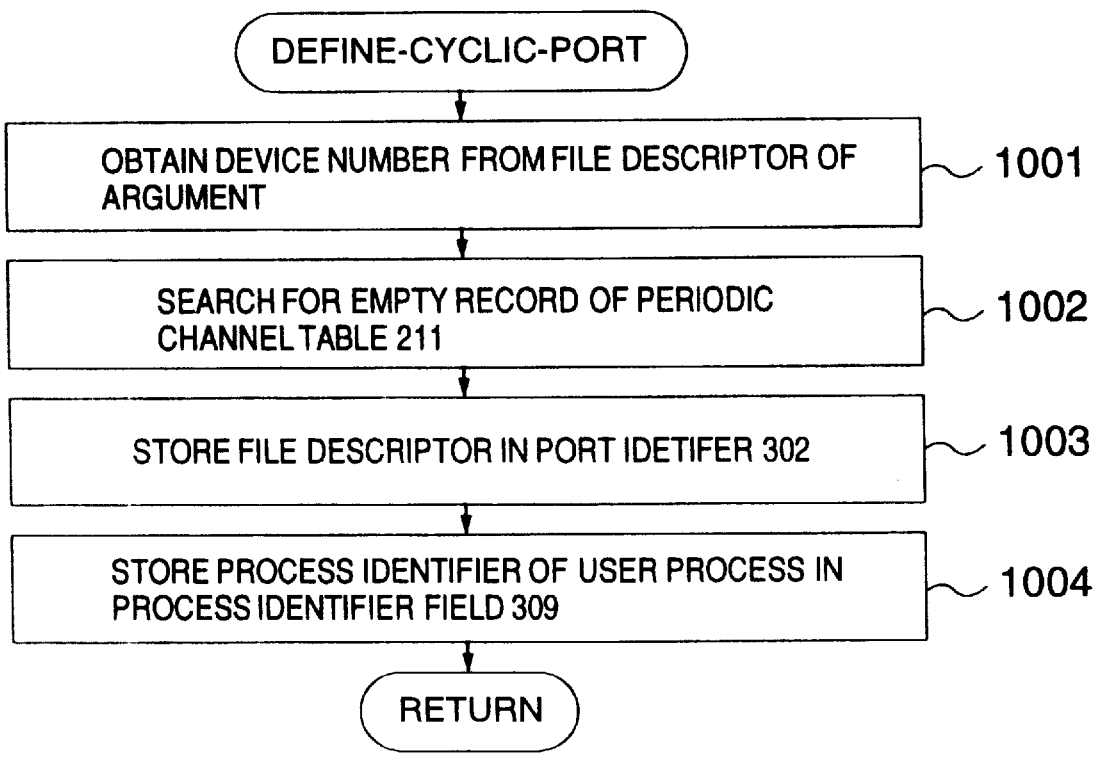
FIG. 10 is a flowchart showing the processing flow of Define-Cyclic-Port.

FIG. 10 is a flow chart of the Define-Cyclic-Port module. By referring to a table administered by the OS on the basis of a file descriptor specified by an argument, an associated device number is obtained (step 1001). Then an empty record of the periodic channel table 211 associated with the device number is searched for (step 1002). In the port identifier 302 of that record, the file descriptor of the argument is stored (step 1003). Furthermore, the process identifier of the application program (user process) which has called this module is derived and stored in the process identifier 309.

Figure 11:
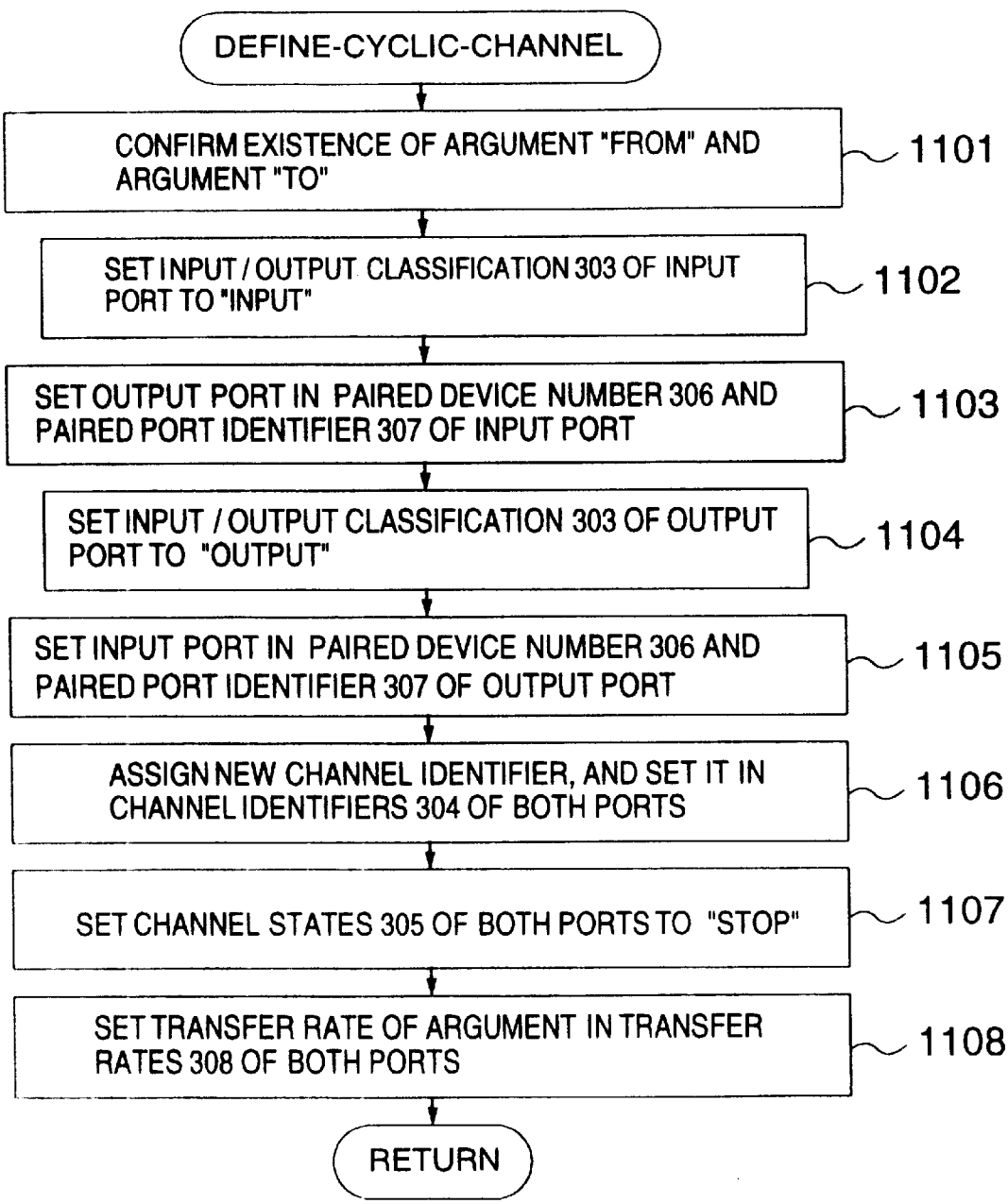
FIG. 11 is a flowchart showing the processing flow of Define-Cyclic-Channel.

FIG. 11 is a flow chart of the Define-Cyclic-Channel module. First of all, it is confirmed that the input port identifier specified by argument "from" and the output port identifier specified by argument "to" have already been registered in the periodic channel table 211 (step 1101). An item of a record associated with the input port of the periodic channel table 211 is then set. The input/output classification 303 is set to "input" (step 1102). In the paired device number 306 and the paired port identifier 307, the information of the output port is set (step 1103). An item of a record associated with the output port of the periodic channel table 211 is then set. The input/output classification 303 is set to "output" (step 1104). In the paired device number 306 and the paired port identifier 307, the information of the input port is set (step 1105). Thereafter, a new channel identifier is assigned between the input port and the output port, and it is set in the channel identifiers 304 of both the record of the input port side and the record of the output port side (step 1106). Their channel status 305 is set to "stop" (step 1107). Finally, the transfer rate specified by the argument is set in the transfer rate 308 of both records (step 1108).

FIG. 12 is a flow chart of the Start-Cyclic-Channel module. First of all, it is determined whether the channel specified by the argument exists on the periodic channel table 211 (step 1201). If the channel does not exist, an error return is caused (step 1202). If the channel exists, flags of both the input side device and the output side device of the periodic driven status flag table 203 are checked up (step 1203). If the flag of either of the devices is off, the input/output command queue 401 is examined and the completion of the input/output command of the wait queue and the active queue of the associated device is waited (step 1204). Thereafter, the flags of both devices are set to on (step 1205).

Subsequently, the command shown in FIG. 4 is created. Data are not sent from the input port to the output port directly, but always sent via the main memory 102. For conducting the data transfer, therefore, it is necessary to create an input command for sending data from the input port to the main memory and an output command for sending data from the main memory to the output port. Furthermore, since the amount of data which can be sent by using one command is limited because of restriction on hardware, it is necessary to create a plurality of commands. In this module, input commands corresponding to the first one period of data transfer which can be effected in the drive period of the periodic driven module, say, 10 ms are created and registered in the wait queue 414. On the basis of the transfer rate 308 included in the periodic channel table 211 and the drive period, the amount of data transferred in one period is determined (step 1206). Furthermore, it is checked up whether the transfer rate exceeds the limit capability determined by the hardware (step 1207). If the transfer rate exceeds the limit capability, an error return is caused (step 1208). On the basis of the amount of transfer data, calculation is conducted to determine how many (N) commands are used to effect the transfer (step 1209). On the basis of the calculated value of N, 2N buffers for data input/output are allocated (steps 1210, 1212). If 2N buffers cannot be allocated, an error return is caused (step 1211). The channel state 305 of records concerning both ports of the periodic channel table is set to "operation" (step 1213). N input commands are created on the main memory in accordance with the command format shown in FIG. 4 and are chained (i.e., enqueued) in the wait queue 414 of the input device side (step 1214). The interrupt control flag 209 of every command on the wait queue is set to off (step 1215), and a return is caused.

In this state, only input commands corresponding to the first one period have been enqueued in the wait queue. Subsequent processing is taken over by the periodic driven module 212. Operation of the periodic driven module will be described later.

In the Stop-Cyclic-Channel module, the channel state 305 of the pertinent channel of the periodic channel table 211 is set to "stop." Furthermore, the records of the pertinent channel of the periodic channel table 211 are deleted. If all of other channels belonging to the same device are in the stop state, the pertinent flag of the periodic driven status flag table 203 is turned off.

Input/output processing conducted by the normal input/output interface will now be described. This normal input/output interface is equivalent to the read or write function supplied by the UNIX. Since the normal input/output interface and the multimedia data transfer interface share the same device, however, special processing is conducted within the module.

Figure 5:
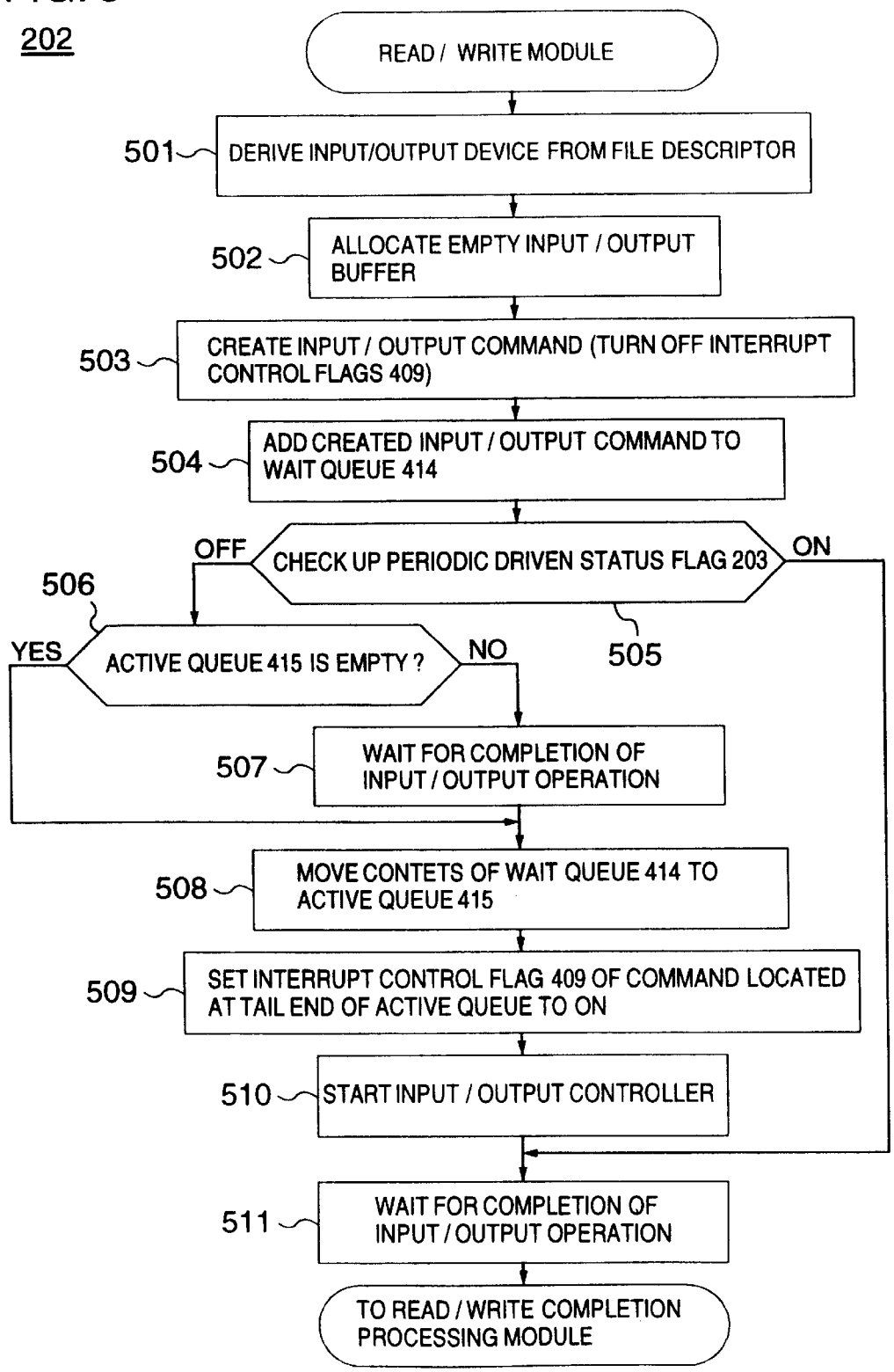
FIG. 5 is a flowchart showing the processing flow of a read/write module.
Figure 6:
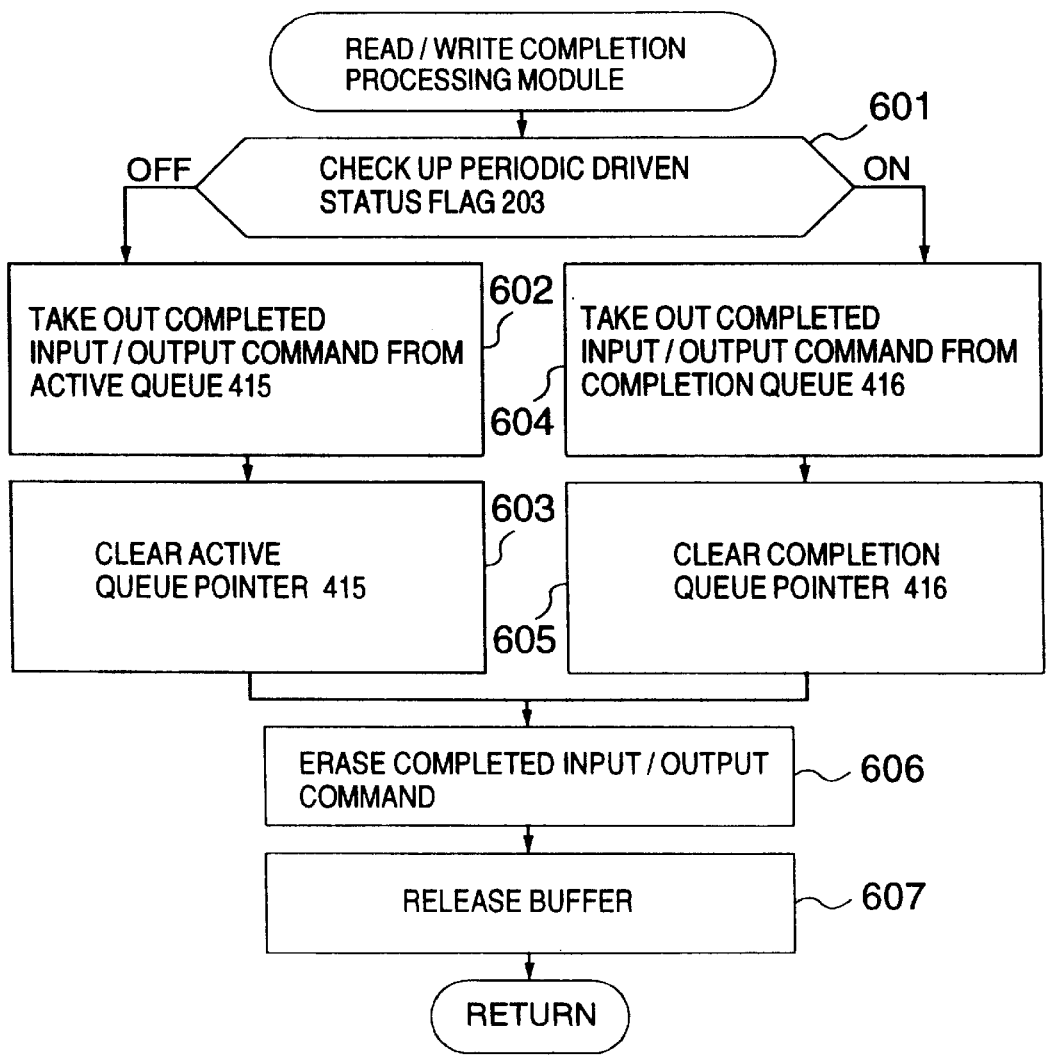
FIG. 6 is a flowchart showing the processing flow of a read/write completion processing module.

FIGS. 5 and 6 show flow charts of the read and write module.

Processing steps 501 through 504 of the read/write module 202 shown in FIG. 5 and a processing flow followed when it is found at step 505 that the periodic driven status flag is off (i.e., processing steps 506, 507, 508, 509, 510 and 511) are provided to implement the input/output processing in the conventional operating system.

From a file descriptor of the argument, an input/output device is derived (step 501). A buffer for data input/output is allocated on the main memory 102 (step 502). An input/output command is created (step 503). At this time, all interrupt control flags in the command are set to off. This command is enqueued in the wait queue 414 (step 504).

The flag of the subject device of the periodic driven status flag table 203 is checked up (step 505). If the flag is off, it is waited for the active queue 415 to become empty. In other words, after the input/output currently in progress has been finished (steps 506 and 507), contents of the wait queue 414 are moved to the active queue 415 as they are (step 508). The interrupt control flag 409 of the command located at the tail end of the active queue is set to on (step 509). Thereafter, an input/output controller is started (step 510), and completion of the input/output operation is waited for (step 511). The input/output controller conducts data input/output in accordance with the command in the active queue.

If the periodic driven status flag of the subject device is on, then the present module creates a command and registers this in the wait queue 414 (step 504), and thereafter the input/output controller is not actually started. The actual start of the input/output controller is taken over by the periodic driven module 212, and the module comes into the wait status (step 511).

If the periodic driven status flag is off, then the wait status is canceled by the input/output completion interrupt from the input/output controller. If the periodic driven status flag is on, then the wait status is canceled by a notice given from the periodic driven module. And processing shown in FIG. 6 is conducted by the read/write completion processing module.

If the periodic driven status flag is off in FIG. 5, then the input/output command is dequeued by the active queue 415 (steps 602 and 603). If the periodic driven status flag is on, then dequeueing from the completion queue 416 is conducted (steps 604 and 605). Thereafter, the area for the completed input/output command and the buffer used for the data input/output is released (steps 606 and 607).

Figure 7:
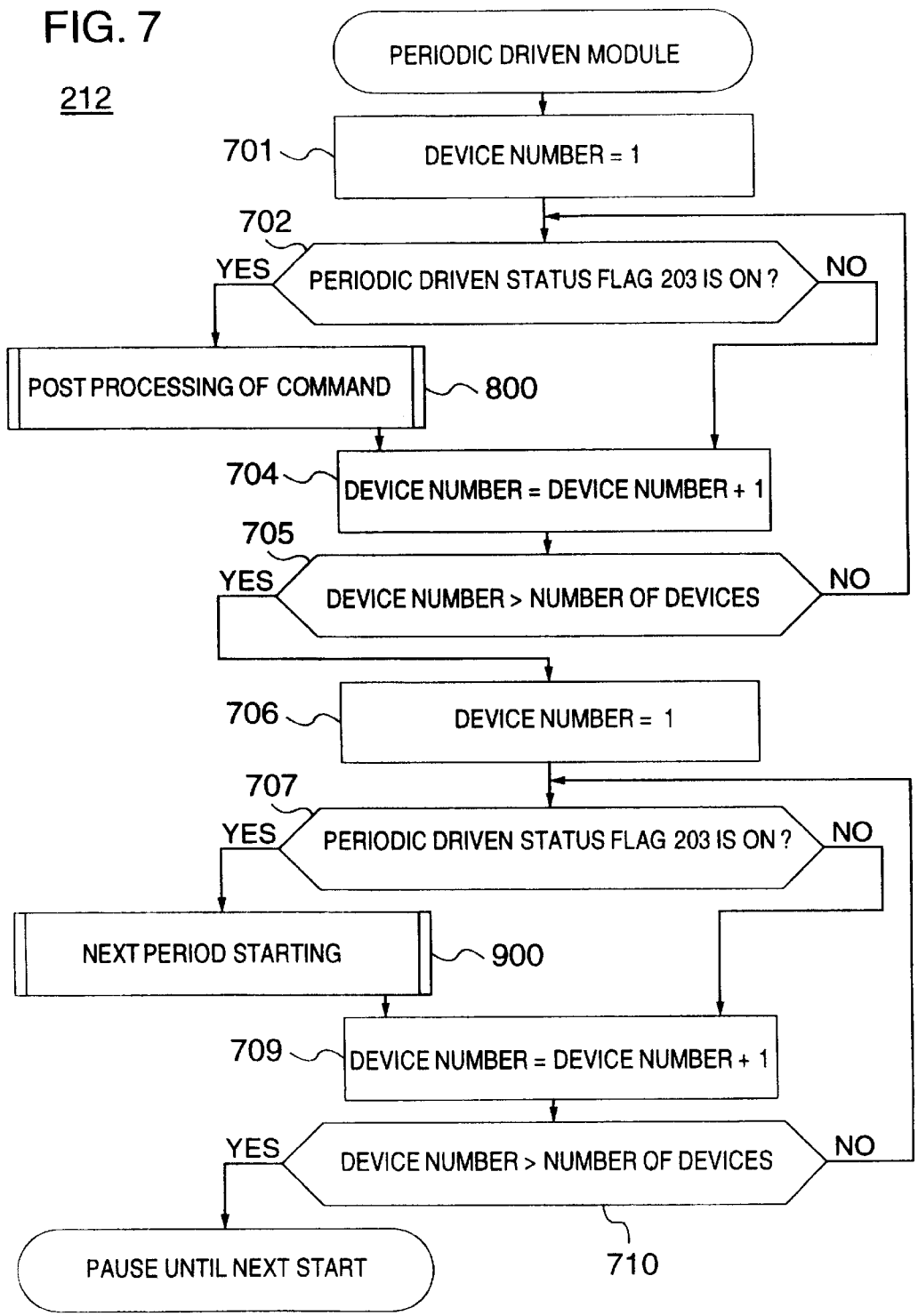
FIG. 7 is a flowchart showing the processing flow of a periodic driven module.
Figure 8:
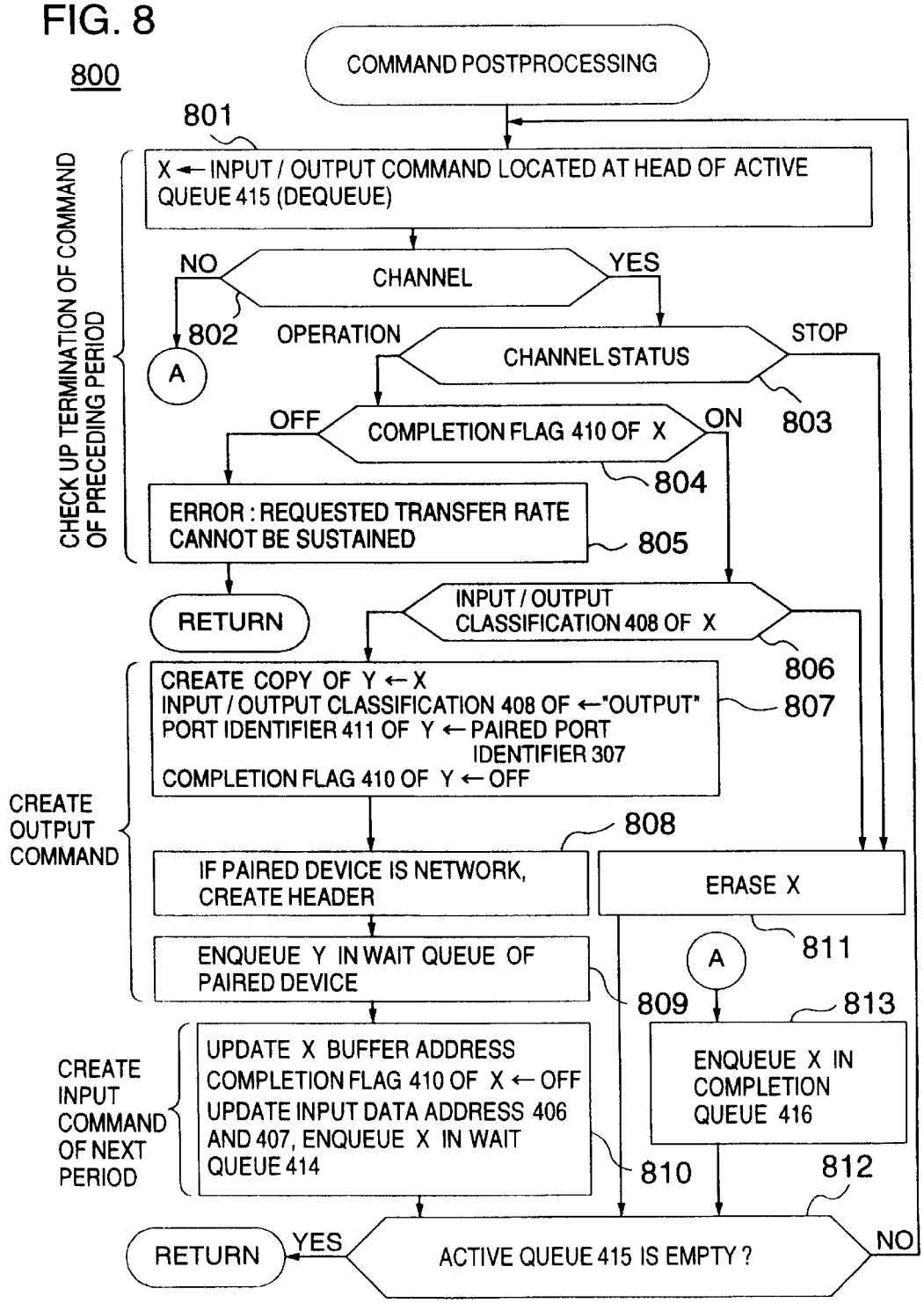
FIG. 8 shows a portion of command postprocessing included in the processing flow of FIG. 7.
Figure 9:
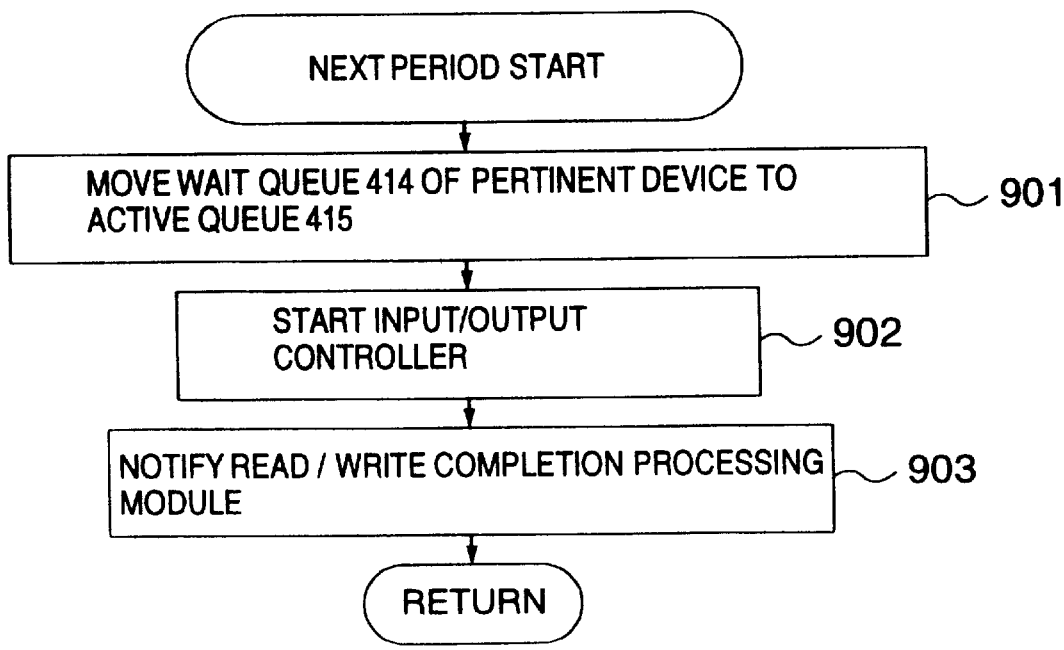
FIG. 9 shows a portion of next period start processing in the processing flow of FIG. 7.

A flow chart of the periodic driven module 212 is shown in FIGS. 7 through 9. The periodic driven module is periodically started with a timer interrupt as a momentum.

Processing of the periodic driven module 212 shown in FIG. 7 is formed by two parts, i.e., postprocessing of an input/output command completed within one period and start of an input/output command to be executed in the next one period. In either processing, devices are scanned in the order of number and it is examined whether they are in the periodic driven status (steps 701, 702, 704, 706, 707, 709 and 710). In the case of the periodic driven status, a command postprocessing module and a next period starting module are called (steps 800 and 900).

A flow chart of the command postprocessing module corresponding to step 800 is shown in FIG. 8. First of all, input/output commands registered in the active queue 415 are taken out one by one (step 801). It is determined whether the pertinent command relates to the multimedia data transfer (periodic data transfer) by referring to the port identifier 411 included in commands and to the periodic channel table 211 (step 802). In the case of nonmultimedia data transfer, the pertinent command is moved to the completion queue 813 (step 813). In the case of multimedia data transfer, it is determined whether the channel is active by referring to the channel status 305 of the periodic channel table 211 (step 803), and the completion flag 410 of the pertinent input/output command is checked up (step 804). If the execution of the pertinent input/output command is not yet completed, i.e., data transfer of one period is not completed during one period, then branching to error processing 805 is conducted and subsequent input/output of the pertinent channel is stopped (step 805).

If it is found at step 806 that the completed input/output command relates to input process, preparations for transferring the inputted data to an output port in the next period are made (steps 807, 808, 809 and 810). If it is found at step 806 that the completed input/output command relates to output process, then the pertinent input/output command is erased (step 811). While in the above described Start-Cyclic-Channel module the data input command from an input port to the main memory is created, in this case using the input command, a part is rewritten, and a data output command from the main memory to an output port is created (steps 807 and 808). As for the data buffer as well, the buffer used for the input processing is handed over to the output processing as it is. This output command is enqueued in the wait queue 414 of the output device (step 809). While in the Start-Cyclic-Channel module only input commands of the first one period are created, input commands of the next period are created by using input commands included in the active queue. The buffer address 404 and the input origination device address 406 to be used are rewritten, the completion flag 410 is reset, and enqueueing in the wait queue 414 of the input device is conducted (step 810). Creation of input commands is continued every period until transfer of all data from the input port has been completed. Therefore, the input operation and the output operation are conducted in parallel in a double buffer system and the output operation is conducted with a delay of one period compared with the input operation.

Processing described heretofore is conducted until the active queue 415 becomes empty (step 812).

A flow chart of the next period start module corresponding to the step 900 is shown in FIG. 9.

Contents of the wait queue 414 for each device are moved to the active queue 415 (step 901). An input/output controller is started (step 902). The input/output controller conducts data input/output operation in accordance with a command included in the active queue 415. Furthermore, in order to conduct postprocessing of an input/output command created by the normal input/output interface and completed within one period (input/output command moved to the completion queue by the step 813), the input/output controller cancels waiting of the read/write completion processing module 210 (step 903).

The periodic driven module repeats the above described processing with a predetermined period.

In the present example, the periodic driven module does not notify the application program that the multimedia data transfer has been completed. Alternatively, the periodic driven module may notify the application program that the multimedia data transfer has been completed or it has been discontinued due to an error. Or the transfer record may be stored in a log file, for example, and the situation of the data transfer may be displayed by a command, for example.

The multimedia data transfer and the normal input/output processing can thus be simultaneously executed for the same device.

What is claimed is:

1. A method of transferring multimedia data from an input device to an output device in a computer system having a plurality of input/output devices, said method comprising the steps of:

specifying an origination and destination of multimedia data transfer and ordering multimedia data transfer start from an application program; and conducting multimedia data transfer by using a predetermined program to control multimedia data transfer, in accordance with the order given by the application program, where the predetermined program divides multimedia data, and transfers the divided multimedia data by using a plurality of input commands.

2. A method of transferring multimedia data according to claim 1, wherein an input/output controller for controlling input/output devices related to multimedia data transfer are controlled so as not to generate an interrupt notifying of input/output operation completion, and completion of the input/output operation is detected by the predetermined program.

3. A method of transferring multimedia data according to claim 2, wherein in the case where another application program conducts a data input/output operation with an input device or an output device in the progress of multimedia transfer, said another application program issues a data input/output order and waits for completion of the data input/output operation, and upon receiving said data input/output order, the predetermined program conducts input/output processing with the device and notifies said another application program when the data input/output operation has been completed.

4. A method of transferring multimedia data according to claim 1, wherein the application program initializes respective ports of origination and destination by using port identifiers identifying the origination and destination of data, defines a channel to be used for transfer by using an input port identifier and an output port identifier, and orders transfer start by using a channel identifier identifying said channel.

5. A computer system having a plurality of input/output devices, said computer system comprising:

a group of multimedia data transfer modules, responsive to a call from an application program at the time of multimedia data transfer from an input device to an output device, to conduct definition of a data origination, a data destination and a data transfer channel, and conduct start and termination of data transfer;

a predetermined program to control multimedia data transfer, said predetermined program being responsive to a transfer start order given by the multimedia data transfer module, to divide transfer data and conduct transfer by using a plurality of input commands and responsive to an input/output order with respect to a device in course of multimedia data transfer given by a data input/output module group, to conduct the data input/output operation and return a notice of completion of the input/output operation to said module group.

6. A computer system according to claim 5, wherein in the case of the subject device of the input/output operation is in course of multimedia data transfer, the data input/output module group asks the predetermined program to conduct input/output processing.

7. A computer system according to claim 5, further comprising:

a status flag table having a flag for each device, said flag representing whether said device is in course of multimedia data transfer, said flag being turned on/off by the multimedia data transfer module group; and a channel table having information for each device, said information being used for multimedia transfer concerning said device, said channel table being updated by the multimedia data transfer module group.

8. A program storage device readable by a machine, said program storage device storing:

a group of multimedia data transfer modules, responsive to a call from an application program at the time of multimedia data transfer from an input device to an output device, to conduct definition of a data option, a data destination and a data transfer channel, and conduct start and termination of data transfer; and a predetermined program to control multimedia data transfer, said predetermined program being responsive to a transfer start order given by the multimedia data transfer module, to divide transfer data and conduct transfer by using a plurality of input commands and responsive to an input/output order with rest to a device in course of multimedia data transfer given by a data input/output module group, to conduct the data input/output operation and return a notice of completion of the input/output operation to said module group.

9. A computer program stored on a storage medium readable by a computer having a plurality of input/output devices, said computer program, when executed by said computer, causes said computer to transfer multimedia data from an input device to an output device by performing the steps of:

specifying an origination and destination of multimedia data transfer and ordering multimedia data transfer start from an application program; and conducting multimedia data transfer by using a predetermined program to control multimedia data transfer in accordance with the order given by the application program, wherein the predetermined program divides multimedia data, and transfer the divided multimedia data by using a plurality of input commands.

* * * * *

UNITED STATES PATENT AND TRADEMARK OFFICE
CERTIFICATE OF CORRECTION

PATENT NO. : 6,145,015
DATED : November 7, 2000
INVENTOR(S) : Masaaki Iwasaki, et al.

It is certified that error appears in the above-identified patent and that said Letters Patent is hereby corrected as shown below:

Item [30] Foreign Priority Data has been omitted. Please insert the following:
--[30] Foreign Priority Data  Japan 07-266775  10/16/95 --.

Signed and Sealed this

Nineteenth Day of June, 2001

*Attest:*

NICHOLAS P. GODICI
*Attesting Officer*     *Acting Director of the United States Patent and Trademark Office*